(12) United States Patent
Ovshinsky et al.

(10) Patent No.: US 7,018,740 B2
(45) Date of Patent: *Mar. 28, 2006

(54) FUEL CELL CATHODE WITH REDOX COUPLE

(75) Inventors: Stanford R. Ovshinsky, Bloomfield Hills, MI (US); Srinivasan Venkatesan, Southfield, MI (US); Boyko Aladjov, Rochester Hills, MI (US); Subhash K. Dhar, Bloomfield Hills, MI (US); Kevin Fok, Troy, MI (US); Thomas Hopper, Clawson, MI (US)

(73) Assignee: Texaco Ovonic Fuel Cell LLC, Rochester Hills, MI (US)

( * ) Notice: Subject to any disclaimer, the term of this patent is extended or adjusted under 35 U.S.C. 154(b) by 303 days.

This patent is subject to a terminal disclaimer.

(21) Appl. No.: 10/663,281

(22) Filed: Sep. 16, 2003

(65) Prior Publication Data

US 2004/0053109 A1    Mar. 18, 2004

Related U.S. Application Data

(63) Continuation of application No. 10/264,760, filed on Oct. 4, 2002, now Pat. No. 6,703,156, which is a continuation-in-part of application No. 09/797,332, filed on Mar. 1, 2001, now Pat. No. 6,620,539.

(51) Int. Cl.
*H01M 4/50* (2006.01)
*H01M 4/00* (2006.01)

(52) U.S. Cl. .................... 429/218.1; 429/224; 429/217; 429/27

(58) Field of Classification Search ............. 429/218.1, 429/224, 217, 27
See application file for complete search history.

(56) References Cited

U.S. PATENT DOCUMENTS

| | | | | |
|---|---|---|---|---|
| 3,791,896 | A | * | 2/1974 | Sklarchuk .................... 429/42 |
| 4,362,791 | A | * | 12/1982 | Kaneko et al. ............. 429/101 |
| 6,447,942 | B1 | * | 9/2002 | Ovshinsky et al. ........... 429/27 |
| 6,620,539 | B1 | * | 9/2003 | Ovshinsky et al. ........... 429/27 |
| 6,703,156 | B1 | * | 3/2004 | Ovshinsky et al. ........... 429/40 |
| 6,777,125 | B1 | * | 8/2004 | Ovhsinsky et al. ........... 429/27 |
| 6,783,891 | B1 | * | 8/2004 | Ovshinsky et al. ...... 429/218.1 |

* cited by examiner

*Primary Examiner*—Patrick Joseph Ryan
*Assistant Examiner*—Angela J. Martin
(74) *Attorney, Agent, or Firm*—Frederick W. Man, II; Marvin S. Siskind

(57) ABSTRACT

Fuel cell oxygen electrode and instant startup fuel cells employing such oxygen electrode. The oxygen electrode operates through the mechanism of redox couples which uniquely provide multiple degrees of freedom in selecting the operating voltages available for such fuel cells. Such oxygen electrodes provide the fuel cells in which they are used a "buffer" or "charge" of oxidizer available within the oxygen electrode at all times.

20 Claims, 3 Drawing Sheets

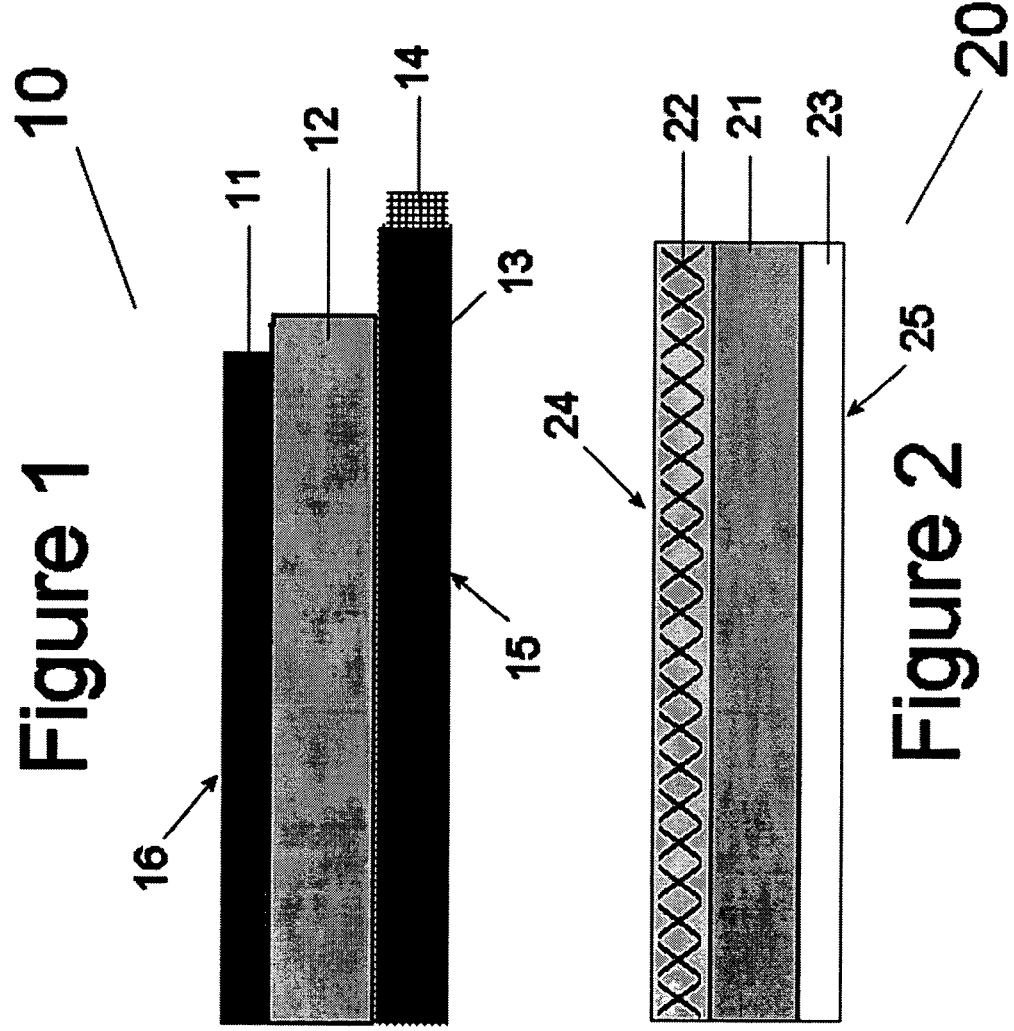

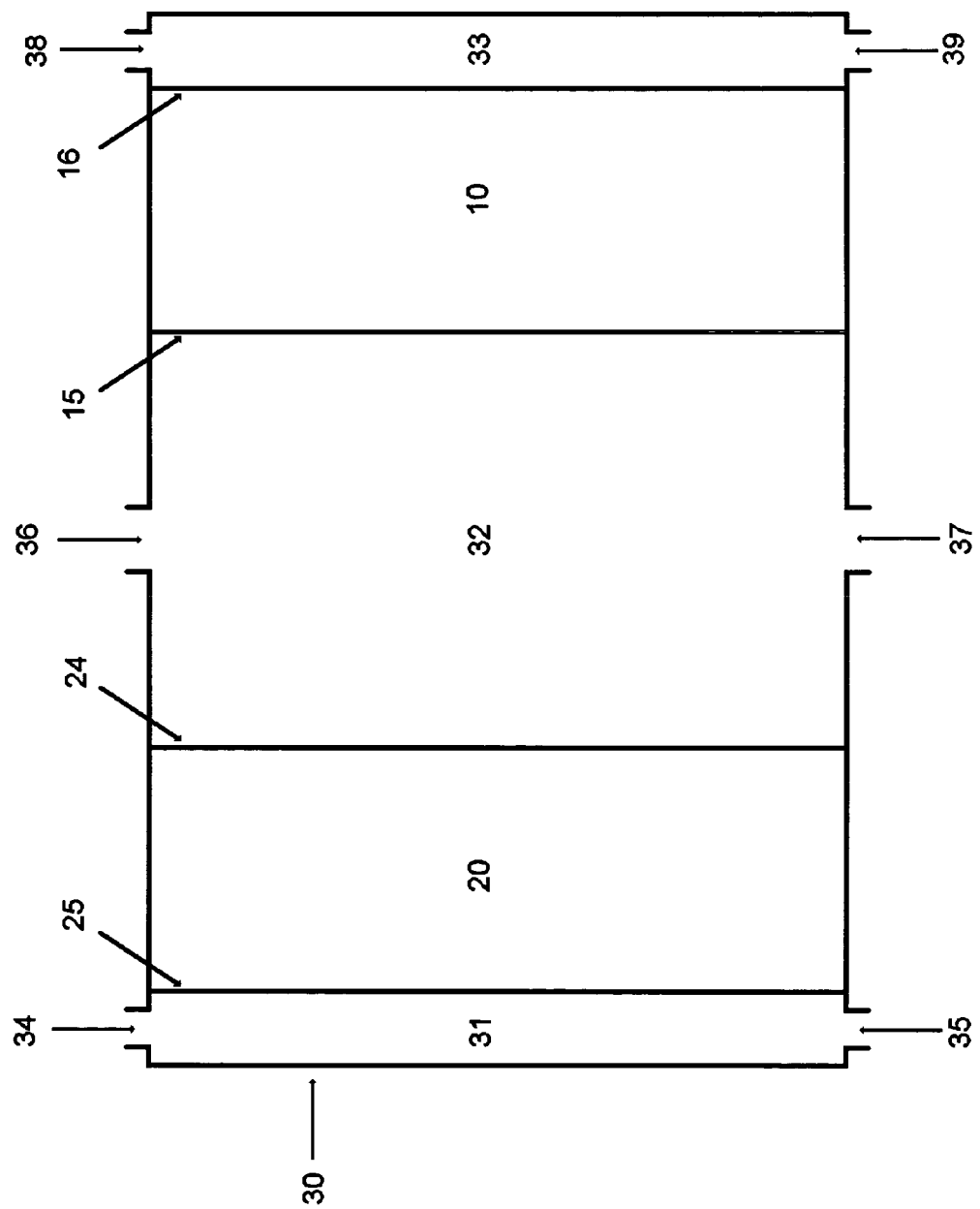

FUEL CELL CATHODE WITH REDOX COUPLE

RELATED APPLICATIONS

The present invention is a continuation of U.S. patent application Ser. No. 10/264,760, which is assigned to the same assignee as the current application, entitled "Fuel Cell Cathode Utilizing Multiple Redox Couples", filed Oct. 4, 2002 now U.S. Pat. No. 6,703,156, which is a continuation-in-part of U.S. Pat. No. 09/797,332 now U.S. Pat. No. 6,620,539, which is assigned to the same assignee as the current application, entitled "Novel Fuel Cell Cathodes and Their Fuel Cells", filed Mar. 1, 2001, the disclosures of which are hereby incorporated by reference.

FIELD OF THE INVENTION

The instant invention relates generally to useful cathode active materials for fuel cells, more specifically to their use as the cathode material for Ovonic instant startup alkaline fuel cells. These inventive oxygen electrodes open up a tremendous number of degrees of freedom in fuel cell design by utilizing reduction/oxidation (redox) couples, such as metal/oxide couples, or simply couples which provide electrochemical oxidizer, preferably oxygen, to the fuel cell electrolyte for electrochemical "combustion". These redox couples, due to their electrochemical potential, provide the fuel cells employing them with an increased operating voltage that is adjustable by varying the redox couple used. Additionally the redox couples provide the fuel cell with the ability to store oxidizer within the electrode which not only provides for instant startup, but also provides the capability to provide short surge bursts of energy during demand surges and also allows for recapture of regenerative energy.

BACKGROUND OF THE INVENTION

The instant application for the first time provides oxygen electrodes, and fuel cells using such electrodes, which use oxide couples to yield a wide selection of operating voltages. Specifically, the instant inventors have determined materials, which used in combination with hydrogen-side electrodes, particularly with those constructed of Ovonic (Trademark of Energy Conversion Devices, Inc.) hydrogen storage material, both of which, in combination, yield high performance fuel cells having hydrogen storage capacity within the hydrogen electrode and oxygen electrodes which take advantage of low-cost, in comparison with the traditional platinum electrodes, oxide couples which allow selection of specific ranges of operating voltage of the electrochemical cells with a broad operating temperature range and the opportunity to provide instant-start by use of the hydrogen storage capability of the short-range order available in the material of the Ovonic hydrogen electrode.

As the world's human population expands, greater amounts of energy are necessary to provide the economic growth all nations desire. The traditional sources of energy are the fossil fuels which, when consumed, create significant amounts of carbon dioxide as well as other more immediately toxic materials including carbon monoxide, sulfur oxides, and nitrogen oxides. Increasing atmospheric concentrations of carbon dioxide are warming the earth; creating the ugly specter of global climatic changes. Energy-producing devices which do not contribute to such difficulties are needed now.

A fuel cell is an energy-conversion device that directly converts the energy of a supplied gas into an electric energy. Highly efficient fuel cells employing hydrogen, particularly with their simple combustion product of water, would seem an ideal alternative to current typical power generations means. Researchers have been actively studying such devices to utilize the fuel cell's potential high energy-generation efficiency.

The base unit of the fuel cell is a cell having an oxygen electrode, a hydrogen electrode, and an appropriate electrolyte. Fuel cells have many potential applications such as supplying power for transportation vehicles, replacing steam turbines, and power supply applications of all sorts. Despite their seeming simplicity, many problems have prevented the widespread usage of fuel cells.

Presently most of the fuel cell R & D is focused on P.E.M. (Proton Exchange Membrane) fuel cells. Unfortunately, the P.E.M. fuel cell suffers from relatively low conversion efficiency and has many other disadvantages. For instance, the membrane and the electrolyte for the system is acidic. Thus, noble metal catalysts are the only useful active materials for the electrodes of the system. Unfortunately, not only are the noble metals costly, they are also susceptible to poisoning by many gases, specifically carbon monoxide (CO). Also, because of the acidic nature of the P.E.M fuel cell electrolyte, the remainder of the materials of construction of the fuel cell need to be compatible with such an environment, which again adds to the cost thereof. The proton exchange membrane itself is quite expensive, and because of it's low proton conductivity at temperatures below 80° C., inherently limits the power performance and operational temperature range of the P.E.M. fuel cell as the PEM is nearly non-functional at low temperatures. Also, the membrane is sensitive to high temperatures, and begins to soften at 120° C. The membrane's conductivity depends on water and dries out at higher temperatures, thus causing cell failure. Therefore, there are many disadvantages to the P.E.M. fuel cell which make it somewhat undesirable for commercial/consumer use.

The conventional alkaline fuel cell has some advantages over P.E.M. fuels cells in that they have higher operating efficiencies, they use less costly materials of construction, and they have no need for expensive membranes. The alkaline fuel cell also has relatively higher ionic conductivity in the electrolyte, therefore it has a much higher power capability. While the conventional alkaline fuel cell is less sensitive to temperature than the PEM fuel cell, the platinum active materials of conventional alkaline fuel cell electrodes become very inefficient at low temperatures. Unfortunately, conventional alkaline fuel cells still suffer from their own disadvantages.

For example, conventional alkaline fuel cells still use expensive noble metal catalysts in both electrodes, which, as in the P.E.M. fuel cell, are susceptible to gaseous contaminant poisoning. The conventional alkaline fuel cell is also susceptible to the formation of carbonates from $CO_2$ produced by oxidation of the hydrogen electrode carbon substrates or introduced via impurities in the fuel and air used at the electrodes. This carbonate formation clogs the electrolyte/electrode surface and reduces/eliminates the activity thereof. The invention described herein eliminates this problem from the hydrogen electrode.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous hydrogen electrode and oxygen electrode and brought into surface contact with the electrolytic solution. The particular materials utilized for the oxygen electrode and hydrogen electrode are important since they must act as efficient catalysts for the reactions taking place.

In an alkaline fuel cell, the reaction at the hydrogen electrode occurs between the hydrogen fuel and hydroxyl ions ($OH^-$) present in the electrolyte, which react to form water and release electrons:

$$H_2 + 2OH^- \rightarrow 2H_2O + 2e^- (E_0 = -0.828 \text{ v}).$$

At the oxygen electrode, the oxygen, water, and electrons react in the presence of the oxygen electrode catalyst to reduce the oxygen and form hydroxyl ions ($OH^-$):

$$O_2 + 2H_2O + 4e^- \rightarrow 4OH^- (E_0 = -0.401 \text{ v}).$$

The total reaction, therefore, is:

$$2H_2 + O_2 \rightarrow 2H_2O (E_0 = -1.229 \text{ v}).$$

The flow of electrons is utilized to provide electrical energy for a load externally connected to the hydrogen electrode and oxygen electrode.

It should be noted that the hydrogen electrode catalyst of the alkaline fuel cell is required to do more than catalyze the reaction of $H^+$ ions with $OH^-$ ions to produce water. Initially the hydrogen electrode must catalyze and accelerate the formation of $H^+$ ions and release of $e^-$ from $H_2$. This occurs via formation of atomic hydrogen from molecular hydrogen. The overall reaction may be simplified and presented (where M is the catalyst) as:

$$M + H_2 \rightarrow 2M \ldots H \rightarrow M + 2H^+ + 2e^-.$$

Thus the hydrogen electrode catalyst must not only efficiently catalyze the electrochemical reaction for formation of water at the electrolyte interface but must also efficiently dissociate molecular hydrogen into atomic hydrogen. Using conventional anode material, the dissociated hydrogen is transitional and the hydrogen atoms can easily recombine to form hydrogen if they are not used very efficiently in the oxidation reaction. With the hydrogen storage hydrogen electrode materials of the inventive instant startup fuel cells, hydrogen is stored in hydride form as soon as they are created, and then are used as needed to provide power.

In addition to being catalytically efficient on both interfaces, the catalytic material must be resistant to corrosion by the alkaline electrolyte. Without such corrosion resistance, the electrode would quickly succumb to the harsh environment and the cell would quickly lose efficiency and die.

One prior art fuel cell hydrogen electrode catalyst is platinum. Platinum, despite its good catalytic properties, is not very suitable for wide scale commercial use as a catalyst for fuel cell hydrogen electrodes, because of its very high cost resulting from the limited world supply. Also, noble metal catalysts like platinum, cannot withstand contamination by impurities normally contained in the hydrogen fuel stream. These impurities can include carbon monoxide which may be present in hydrogen fuel or contaminants contained in the electrolyte such as the impurities normally contained in untreated water including calcium, magnesium, iron, and copper.

The above contaminants can cause what is commonly referred to as a "poisoning" effect. Poisoning occurs where the catalytically active sites of the material become inactivated by poisonous species invariably contained in the fuel cell. Once the catalytically active sites are inactivated, they are no longer available for acting as catalysts for efficient hydrogen oxidation reaction at the hydrogen electrode. The catalytic efficiency of the hydrogen electrode therefore is reduced since the overall number of available catalytically active sites is significantly lowered by poisoning. In addition, the decrease in catalytic activity results in increased over-voltage at the hydrogen electrode and hence the cell is much less efficient adding significantly to the operating costs. Overvoltage is the difference between the actual working electrode potential under some conditions and it's equilibrium value, the physical meaning of overvoltage is the voltage required to overcome the resistance to the passage of current at the surface of the hydrogen electrode (charge transfer resistance). The overvoltage represents an undesirable energy loss which lowers operating efficiency and adds to the operating costs of the fuel cell.

In related work, U.S. Pat. No. 4,623,597 ("the '597 patent") and others in it's lineage, the disclosure of which is hereby incorporated by reference, one of the present inventors, Stanford R. Ovshinsky, described disordered multi-component multi-phase hydrogen storage materials for use as negative electrodes in electrochemical cells for the first time. In this patent, Ovshinsky describes how disordered materials can be tailor made (i.e., atomically engineered) to greatly increase hydrogen storage and reversibility characteristics. Such disordered materials are amorphous, microcrystalline, intermediate range order, and/or polycrystalline (lacking long range compositional order) wherein the polycrystalline material includes topological, compositional, translational, and positional modification and disorder. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed the batteries to be utilized most advantageously as secondary batteries, but also as primary batteries.

Tailoring of the local structural and chemical order of the materials of the '597 patent was of great importance to achieve the desired characteristics. The improved characteristics of the hydrogen electrodes of the '597 patent were accomplished by manipulating the local chemical order and hence the local structural order by the incorporation of selected modifier elements into a host matrix to create a desired disordered material. Disorder permits degrees of freedom, both of type and of number, within a material, which are unavailable in conventional materials. These degrees of freedom dramatically change a materials physical, structural, chemical and electronic environment. The disordered material of the '597 patent have desired electronic configurations which result in a large number of active sites. The nature and number of storage sites were designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods there between resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of electro-catalytically active sites and hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

Disorder can be of an atomic nature in the form of compositional or configurational disorder provided throughout the bulk of the material or in numerous regions of the material. The disorder also can be introduced by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve important improved and unique results, using the Ovshinsky principles of disorder on an atomic or microscopic scale.

Additionally, in copending U.S. application Ser. No. 09/524,116, ('116), the disclosure of which is hereby incorporated by reference, Ovshinsky has employed the principles of atomic engineering to tailor materials which uniquely and dramatically advance the fuel cell art. The invention of '116 application has met a need for materials which allow fuel cells to startup instantaneously by providing an internal source of fuel, to operate in a wide range of ambient temperatures to which a fuel cell will be exposed to under ordinary consumer use and to allow the fuel cell to be run in reverse as an electrolyzer thereby utilizing/storing recaptured energy. The hydrogen electrodes of the '116 fuel cells are formed from relatively inexpensive hydrogen storage materials which are highly catalytic to the dissociation of molecular hydrogen and the formation of water from hydrogen and hydroxyl ions as well as being corrosion resistant to the electrolyte, resistant to contaminant poisoning from the reactant stream and capable of working in a wide temperature range.

The next step in the evolution of the fuel cell would be to find suitable materials to replace the expensive platinum oxygen electrode catalysts of conventional fuel cells. It would also be advantageous to provide the oxygen electrode with the ability to store chemical energy (possibly in the form of chemically bound oxygen) to assist in the instant startup of the fuel cell as well as recapture energy Thus there is a need within the art for such a material. The invention described in this application is significant in that it provides the next step in the development of such electrochemical cells. With this invention, the oxygen electrode can be selected from a broad menu of available possible redox couples and combinations thereof. These redox couples in addition to providing a store of chemical energy, allow the operating voltage of the fuel cell to be selected, choosing the appropriate redox couple, alone or in combination.

SUMMARY OF THE INVENTION

The present invention discloses a fuel cell which has the ability to start up instantly and can accept recaptured energy such as that of regenerative braking by operating in reverse as an electrolyzer. The instant startup fuel cells have increased efficiency and power availability (higher voltage and current) and a dramatic improvement in operating temperature range (−20 to 150° C.) The fuel cells of the instant invention also have additional degrees of freedom over the fuel cells of the prior art in that the voltage output of the cell can be tailored and they are capable of storing regenerated energy.

The oxygen electrodes of the instant fuel cells operate through the mechanism of redox reactions which uniquely provide multiple degrees of freedom in selecting the operating voltages available for such fuel cells. Such oxygen electrodes provide the fuel cells in which they are used, particularly alkaline fuel cells, with a level of chemical energy storage within the oxygen electrode itself. This means that such fuel cells will have a "buffer" or "charge" available within the oxygen electrode at pre-startup.

The fuel cell oxygen electrode comprises an active material capable of reversibly storing energy through the mechanism of a redox couple. The electrode has a first surface region situated to be exposed to molecular oxygen which includes a catalytically acting component promoting the absorption of oxygen through said first surface region and into said active material to chemically charge said active material through oxygen absorption.

The fuel cell oxygen electrodes of this invention may utilize redox couples, particularly metal/oxides couples selected from the group of metals consisting of copper, silver, zinc, cobalt and cadmium. Another useful redox couple is the nickel hydroxide/nickel oxyhydroxide couple disclosed herein above. Multiple redox couples may be used in combination resulting in a synergistic effect providing improved performance of the oxygen electrode.

The fuel cell also employs an anode active material which has hydrogen storage capability. The anode active material is a hydrogen storage alloy which has excellent catalytic activity for the formation of atomic hydrogen from molecular hydrogen, outstanding catalytic activity toward the formation of water from hydrogen ions and hydroxyl ions, and has exceptional corrosion resistance toward the alkaline electrolyte of an alkaline fuel cell. The anode active material is also low cost, containing no noble metals. The materials are robust and poison resistant. The electrodes are easy to produce, by proven low cost production techniques. The hydrogen electrode eliminates the use of carbon therein, thus helping to eliminating the carbonate poisoning of the fuel cell.

The anode active hydrogen storage alloys useful in the instant startup fuel cells reversibly absorbs and releases hydrogen and has a fast hydrogenation reaction rate and a long shelf-life. The hydrogen storage alloy is preferably selected from Alkaline Earth-Nickel alloys, Rare-Earth/Misch metal alloys, zirconium alloys, titanium alloys and mixtures or alloys thereof. The preferred hydrogen storage alloy contains enriched catalytic nickel regions distributed throughout the oxide surface of the particulate thereof. The catalytic nickel regions are 50 to 70 Angstroms in diameter and vary in proximity from 2 to 300 Angstroms (preferably from 50 to 100 Angstroms). An example of such an alloy has the following composition:

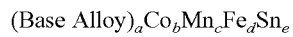

$(\text{Base Alloy})_a\text{Co}_b\text{Mn}_c\text{Fe}_d\text{Sn}_e$ where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and $a+b+c+d+e=100$ atomic percent.

BRIEF DESCRIPTION OF THE DRAWINGS

FIG. 1 is a stylized schematic depiction of a fuel cell oxygen electrode used in the fuel cells of the instant invention.

FIG. 2 is a stylized schematic depiction of an inventive fuel cell hydrogen electrode used in the fuel cells of the instant invention.

FIG. 3 is a stylized schematic depiction of the instant startup alkaline fuel cell with hydrogen storage electrode and oxide couple electrode in a preferred embodiment of the instant invention.

DETAILED DESCRIPTION OF THE INVENTION

Figure 4:
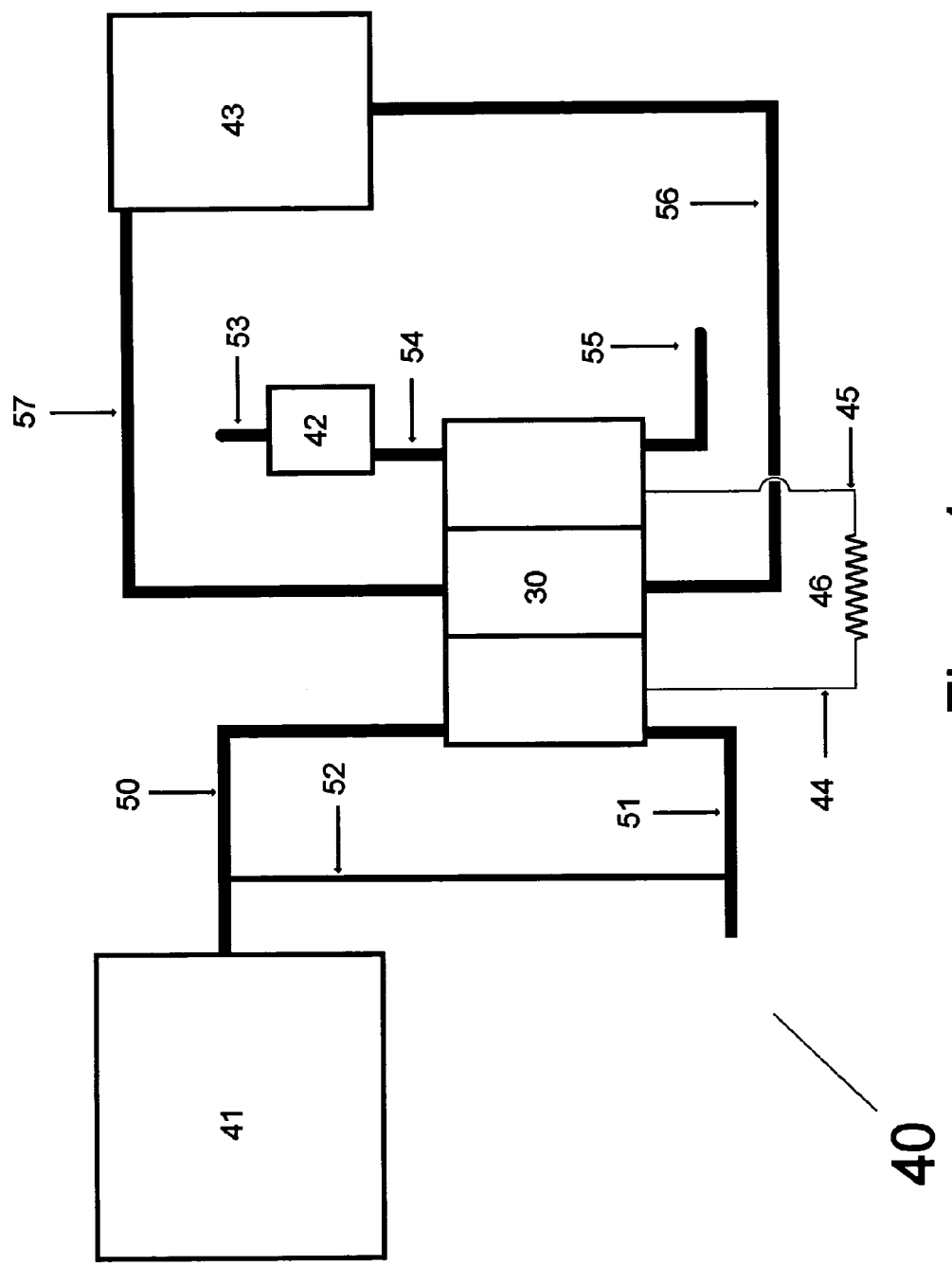
FIG. 4 is a stylized schematic depiction of an energy supply system incorporating the instant startup alkaline fuel cell of a preferred embodiment of the instant invention.

This invention relates to catalysts for oxygen electrodes in fuel cells which operate through the mechanism of redox reactions. Such oxygen electrodes, or oxidizable electrodes, provide the fuel cells in which they are used, particularly alkaline fuel cells, with a level of electrochemical energy storage within the oxygen electrode itself. This means that such fuel cells will have a "buffer" or "charge" of reactant available within the oxygen electrode at pre-startup which, particularly combined with hydrogen storage anodes described in copending U.S. application Ser. No. 09/524,116 (the disclosure of which is hereby incorporated by reference), yield instant start fuel cells in general and more specifically to Ovonic instant start alkaline fuel cells. Such fuel cells have a built in reserve of hydrogen within the hydrogen electrode and oxygen electrode reactant (possibly oxygen) in the oxygen electrode for instant startup (discussed herein below), and have the ability to accept the energy of regenerative braking by acting as an electrolyzer (also discussed herein below). The fuel cell has increased efficiency and increased power capabilities as compared with conventional fuel cells of the prior art, while dramatically increasing the operating temperature range of the cell (−20 to 150° C.) The fuel cell is easy to assemble and has the advantage of utilizing proven, low cost production techniques.

The present invention also relates to fuel cell hydrogen electrodes and oxygen electrodes, and an energy supply system incorporating the present fuel cell. The hydrogen electrode includes materials which have inherent catalytic activity as well as hydrogen storage capacity. The oxygen electrodes utilize redox couples, or combinations of redox couples acting synergistically, providing for the reduction and storage of oxygen within the oxygen electrode. The oxygen electrode and hydrogen electrode materials do not need any noble metals, and are therefore inherently low cost. The oxygen electrode and hydrogen electrode materials are robust and long-lived, being resistant to poisoning. The hydrogen electrode does not utilize the carbon substrates of the prior art. While a detailed discussion of the instant electrodes and their utilization in an alkaline fuel cell is described herein below, it should be noted that the concepts of the instant invention can be applied to other types of fuel cells (e.g. P.E.M. fuel cells).

In general, for such fuel cell oxygen electrodes, oxygen is generally available to the oxygen electrode on a continuously-supplied basis on one side thereof where the catalytically active material converts the molecular oxygen into atomic oxygen which is reduced by electrolyte at the electrolyte contacting surface of the oxygen electrode to form hydroxyl ions. In prior art oxygen electrodes, no storage of reactant occurs. That is oxygen travels directly through the active materials and reacts with the electrolyte at the electrolyte contacting side of the oxygen electrode. In the oxygen electrodes of the instant invention, oxygen is stored in the oxygen electrode within the reversible redox couples, and is then available, at the electrode/electrolyte interface of the oxygen electrode. Available electrons will then be generated through the electrochemical reaction with the fuel. Thus the fuel cell will provide a constant supply of electricity at voltages characteristic of the redox couple, or electrochemically reversible redox system (e.g. a metal and its oxide). Additionally, this added benefit may be obtained by redox couples other than between the simple combination of a metal and its oxidized form. An example of this is the redox couple of cobalt hydroxide/cobalt oxyhydroxide. With such a redox couple system, the fuel cell will provide a potential whose theoretical voltage limit is the sum of the hydrogen electrode and oxygen electrode reactions. Certainly the theoretical limit of voltage available is modified or limited by other considerations, particularly including internal resistance of the electrodes and the complete fuel cell system.

At the oxygen electrode, the oxygen, water, and electrons react in the presence of the cathode active material to reduce the oxygen and form hydroxyl ions (OH⁻):

$$O_2 + 2H_2O + 4e^- \rightarrow 4OH^-.$$

The flow of electrons is utilized to provide electrical energy for a load externally connected to the hydrogen electrode and oxygen electrode. That load is available to be filled by any number of needs including, but not limited to, powering motive vehicles, lighting devices, heating or cooling devices, power tools, entertainment devices, and other electricity-consuming devices too numerous to mention.

Numerous redox couples exist and may be used alone or in combination to form the oxygen electrode of this invention. When used in combination, the redox couples may complement one another to provide improved kinetics within the oxygen electrode. The improved kinetics within the oxygen electrode are a result of the multiple redox couples assisting each other synergistically.

When such couples are used, cycling transition from the oxidized form to the reduced form is accomplished repeatedly and continuously. From a practical point of view, the ability to withstand such cycling is preferred. Following is a list of potential redox couples that may be used alone or in combination in the oxygen electrode in accordance with the present invention.

(1) $Co^{+2} \longleftrightarrow Co^{+3}$ (Valency level 2 to a valency level 3)

$$Co(OH)_2 + OH^- \longrightarrow CoOOH + H_2O + e^-$$

(2) $Co^{+2} \longleftrightarrow Co^{+4}$ (Valency level 2 to a valency level 4)

$$Co(OH)_2 + 2OH^- \longrightarrow Co(OH)_4 + 2e^-$$

$$Co(OH)_4 \longrightarrow CoO_2 + 2H_2O$$

(3) $Ni^{+2} \longleftrightarrow Ni^{+3}$ (Valency level 2 to valency level 3)

$$Ni(OH)_2 + OH^- \longrightarrow NiOOH + H_2O + e^-$$

(4) $Ni^{+2} \longleftrightarrow Ni^{+4}$ (Valency level 2 to valency level 4)

$$Ni(OH)_2 + 2OH^- \longrightarrow Ni(OH)_4 + 2e^-$$

$$Ni(OH)_4 \longrightarrow NiO_2 + 2H_2O$$

(5) $Ag \longleftrightarrow Ag^+$ (Valency level 0 to valency level 1)

$$2Ag + 2OH^- \longrightarrow Ag_2O + H_2O + e^-$$

(6) $Ag \longleftrightarrow Ag^{+2}$ (Valency level 0 to valency level 2)

$$Ag + 2OH^- \longrightarrow AgO + H_2O + 2e^-$$

(7) $Cu \longleftrightarrow Cu^{+2}$ (Valency level 0 to valency level 2)

$$Cu + 2OH^- \longrightarrow CuO + H_2O + 2e^-$$

(8) $(Ni/Ag)^{+2} \longleftrightarrow (Ni/Ag)$ (9) $(Ni/Fe)oxide^{+2} \longleftrightarrow (Ni/Fe)oxide^{+3}$

(10) $Mn^{+2} \longleftrightarrow Mn^{+3} \longrightarrow Mn^{+7}$

(11) $Sn^{+2} \longleftrightarrow Sn^{+4}$

Groups 8, 9, 10, and 11 are comprised of multiple elements having multiple valency states. The multiple valency states create difficulty in predicting which reaction is predominant in each grouping.

Amphoteric elements like aluminum, boron, and silicon may also be used when incorporated into appropriate chemical compounds to suppress their solubility in alkaline solutions contacting the oxygen electrode. Various mixed oxides, sulfides, and halides may also be used where any of the above mentioned reactions, alone or in combination, have a valency change linked to them.

In all of the previously described reactions, the overall reaction is still oxygen reduction. In these reactions the pathway chosen is not a direct electrochemical reduction of $O_2$, but via a redox reaction. This gives another degree of freedom to choose the right redox reaction, matching the kinetics and the operating potential desired.

The fuel cell oxygen electrodes of the instant invention also include a catalytic material which promotes the dissociation of molecular oxygen into atomic oxygen (which reacts with the redox couple). A particularly useful catalyst is carbon. As discussed herein below this carbon should be very porous and may be electrically conductive.

The oxygen electrodes may contain an active material component which is catalytic to the dissociation of molecular oxygen into atomic oxygen, catalytic to the formation of hydroxyl ions (OH⁻) from water and oxygen ions, corrosion resistant to the electrolyte, and resistant to poisoning. A material useful as an active material in the oxygen electrode is on a host matrix including at least one transition metal element which is structurally modified by the incorporation of at least one modifier element to enhance its catalytic properties. Such materials are disclosed in U.S. Pat. No. 4,430,391 ('391) to Ovshinsky, et al., published Feb. 7, 1984, the disclosure of which is hereby incorporated by reference. Such a catalytic body is based on a disordered non-equilibrium material designed to have a high density of catalytically active sites, resistance to poisoning and long operating life. Modifier elements, such as La, Al, K, Cs, Na, Li, Ga, C, and O structurally modify the local chemical environments of the host matrix including one or more transition elements such as Mn, Co and Ni to form the catalytic materials of the oxygen electrode. These low over-voltage, catalytic materials increase operating efficiencies of the fuel cells in which they are employed.

The oxygen electrode may be formed the same as conventional oxygen electrodes which use platinum catalysts, but the non-noble-metal catalysts described above are substituted for the platinum. The non-noble catalysts are finely divided and disbursed throughout a porous carbon matte-like material. The material may or may not have a conductive substrate as needed.

The fuel cell oxygen electrodes of this invention utilize combinations of redox couples which provide for oxygen reduction and storage. The oxygen electrodes of the instant invention may also include a catalytic material which promotes and speeds the dissociation of molecular oxygen into atomic oxygen (which reacts with the redox couple). A particularly useful catalyst is carbon. This carbon should be very porous and may be electrically conductive.

The oxygen electrode also needs a barrier means to isolate the electrolyte, or wet, side of the oxygen electrode from the gaseous, or dry, side of the oxygen electrode. A beneficial means of accomplishing this is by inclusion of a hydrophobic component comprising a halogenated organic compound, particularly polytetrafluoroethylene (PTFE) within the electrode.

The oxygen electrodes, may also include a current collector or current collecting system extending within said active material. The current collector may comprise an electrically conductive mesh, grid, foam or expanded metal. The choice of such collection systems may be made according to electrode manufacturing or production system needs.

The oxygen electrode in the preferred embodiment of the present invention has a layered structure and is shown in FIG. 1. The layered structure promotes oxygen dissociation and absorption within the oxygen electrode 10. Each oxygen electrode 10 is composed of a thin A layer 11, a B layer 12, and a C 13 layer with a current collector grid 14 embedded within the C layer 13. The C layer 13 is on the electrolyte contacting side 15 of the oxygen electrode 10 and the A layer 11 is on the oxygen contacting side 16 of the oxygen electrode 10. The A layer 11 may be composed of carbon particles coated with polytetrafluoroethylene (PTFE). The carbon particles may be acetylene black or Vulcan XC-72, which are well known in the art. The carbon/PTFE mixture may contain approximately 30% PTFE with the remainder comprising carbon, thereby making the carbon 30% teflonated. The 30% teflonated carbon is mixed with the redox couple catalyst. The redox couple catalyst comprises approximately 10% of the A layer while the 30% teflonated carbon comprises the remaining 90% of the A layer. The B layer 12 may be wholly composed of carbon particles coated with polytetrafluoroethylene. The carbon particles may be carbon black known as Vulcan XC-72 carbon (Trademark of Cabot Corp.), which is well known in the art. The B layer 12 may contain approximately 40 percent by weight polytetrafluoroethylene with the remainder consisting of carbon particles. The C layer 13 may contain approximately 65 percent a teflonated carbon mixture, 15% graphite, and 20% redox couple catalyst. The teflonated carbon mixture may comprise Vulcan XC-72, Acetylene Black, Cabot Black Pearl 2000, or other types of carbon well known in the art teflonated to 20%. The graphite is preferably TIMREX SFG 44 graphite (Trademark of Timcal Group). Embedded throughout the C layer is a current collector grid serving both as a substrate and a current collector. Examples of current collector grids include, but are not limited to, mesh, grid, matte, expanded metal, foil, foam and plate. The cobalt oxide may also contain a lithium-aluminum alloy, gallium, or other modifiers for improved performance.

Reactive elements such as lithium may be added to the redox couple in the form of a non-reactive alloy such as a LiAl alloy. That is, lithium alone as an individual element is extremely reactive with oxygen and water vapor, therefore it is advisable to incorporate the element into the redox couple in the form of an alloy with aluminum which is not reactive in this way. Other elements which may be alloyed with the lithium include boron and silicon. Specifically the LiAl alloy is a 50:50 At. % alloy.

In a fuel cell the oxygen electrode just described is used in conjunction with hydrogen electrodes. While any functional hydrogen electrode may be used with the inventive oxygen electrode, preferred embodiments of the fuel cells of this invention will include hydrogen electrodes employing hydrogen storage alloy active materials. It should be noted that the preferred hydrogen electrode catalyst of the alkaline fuel cell is required to do more than catalyze the reaction of $H^+$ ions with $OH^-$ ions to produce water. Initially the hydrogen electrode must catalyze and accelerate the formation of $H^+$ ions. This occurs via formation of atomic hydrogen from molecular hydrogen. The overall reaction can be seen as (where M is the hydrogen storage anode active alloy material):

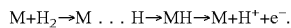
$$M+H_2 \rightarrow M \ldots H \rightarrow MH \rightarrow M+H^+ +e^-.$$

That is, molecular hydrogen ($H_2$) is converted to adsorbed atomic hydrogen (M . . . H) onto the surface of the hydrogen electrode. This adsorbed hydrogen is very quickly converted to a metal hydride (MH) in the bulk of the hydrogen storage alloy. This hydride material is then converted to ionic $H^+$ releasing an electron $e^-$. The ionic hydrogen reacts with a hydroxyl ion in the electrolyte to produce water and the electron is released into the external load circuit. Thus the hydrogen electrode catalyst must not only efficiently catalyze the formation of water at the electrolyte interface but must also efficiently dissociate molecular hydrogen into ionic hydrogen. Using conventional hydrogen electrode material, the dissociated hydrogen is transitional and the hydrogen atoms can easily recombine to form hydrogen if they are not used very quickly in the oxidation reaction. With hydrogen storage electrode materials, hydrogen is trapped in hydride form as soon as hydrides are created. The hydrogen, as electrochemically released into the electrolyte, are then used as needed to provide the fuel cell's electrical power output.

In addition to being catalytically efficient on both interfaces, the hydrogen electrode catalytic material must be resistant to corrosion by the alkaline electrolyte. Without such corrosion resistance, the electrode would quickly succumb to the harsh environment and the cell would quickly lose efficiency and die.

One prior art fuel cell hydrogen electrode catalyst is platinum. Platinum, despite its good catalytic properties, is not very suitable for wide scale commercial use as a catalyst for fuel cell hydrogen electrodes, because of its very high cost. Also, noble metal catalysts like platinum, also cannot withstand contamination by impurities normally contained in the hydrogen fuel stream. These impurities can include carbon monoxide (which may be present in hydrogen fuel) or contaminants contained in the electrolyte such as the impurities normally contained in untreated water including calcium, magnesium, iron, and copper.

The above contaminants can cause what is commonly referred to as a "poisoning" effect. Poisoning occurs where the catalytically active sites of the material become inactivated by poisonous species invariably contained in the fuel cell. Once the catalytically active sites are inactivated, they are no longer available for acting as catalysts for efficient hydrogen oxidation reaction at the hydrogen electrode. The catalytic efficiency of the hydrogen electrode therefore is reduced since the overall number of available catalytically active sites is significantly lowered by poisoning. In addition, the decrease in catalytic activity results in increased overvoltage at the hydrogen electrode and hence the cell is much less efficient adding significantly to the operating costs. Overvoltage is the difference between the electrode potential and it's equilibrium value, the physical meaning of over-voltage is the voltage required to overcome the resistance to the passage of current at the surface of the hydrogen electrode (charge transfer resistance). The overvoltage represents an undesirable energy loss which adds to the operating costs of the fuel cell.

The hydrogen electrodes may be generally composed of an anode active material having hydrogen storage capacity. The anode active material is designed to have a high density of active catalytic sites, resistance to poisoning, and long operating life to provide efficient low cost fuel cell operation.

An anode active material of the instant invention may be a composite of a hydrogen storage material and an additional catalytic material. The preferable anode active material is one which can reversibly absorb and release hydrogen irrespective of the hydrogen storage capacity and has the properties of a fast hydrogenation reaction rate, a good stability in the electrolyte and a long shelf-life. It should be noted that, by hydrogen storage capacity, it is meant that the material stores hydrogen in a stable form, in some nonzero amount higher than trace amounts. Preferred materials will store about 1 weight % hydrogen or more. Preferably, the alloys include, for example, rare-earth/Misch metal alloys, zirconium and/or titanium alloys or mixtures thereof. The anode material may even be layered such that the material on the hydrogen contacting surface is formed from a material which has been specifically designed to be highly catalytic to the dissociation of molecular hydrogen into atomic hydrogen, while the material on electrolyte contacting surface is designed to be highly catalytic to the formation of water from hydrogen and hydroxyl ions.

Certain hydrogen storage materials are exceptionally useful as alkaline fuel cell hydrogen electrode materials. The useful hydrogen storage alloys have excellent catalytic activity for the formation of hydrogen ions from molecular hydrogen and also have superior catalytic activity toward the formation of water from hydrogen ions and hydroxyl ions. In addition to having exceptional catalytic capabilities, the materials also have outstanding corrosion resistance toward the alkaline electrolyte of the fuel cell. In use, the alloy materials act as 1) a molecular hydrogen decomposition catalyst throughout the bulk of the hydrogen electrode; and 2) as an internal hydrogen storage buffer to insure that a ready supply of hydrogen atoms is always available at the electrolyte contacting surface.

Specific alloys useful as the anode material are alloys that contain enriched catalytic nickel regions of 50–70 Angstroms in diameter distributed throughout the oxide interface which vary in proximity from 2–300 Angstroms preferably 50–100 Angstroms, from region to region. As a result of these nickel regions, the materials exhibit significant catalysis and conductivity. The density of Ni regions in the alloys provide powder particles having an enriched Ni surface. The most preferred alloys having enriched Ni regions are alloys having the following composition: (Base Alloy)$_a$Co$_b$Mn$_c$Fe$_d$Sn$_e$ where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent. Such materials are disclosed in U.S. Pat. No. 5,536,591 to Fetcenko et al., published Jul. 16, 1996, the disclosure of which is hereby incorporated by reference.

The hydrogen electrodes in the preferred embodiment of the present invention have a layered structure and are exemplified in FIG. 2. The layered structure promotes hydrogen dissociation and absorption within the hydrogen electrode 20. Each hydrogen electrode 20 is composed of an active material layer 21, a current collector grid 22, and a porous polytetrafluoroethylene layer 23. The active material layer 21 is disposed between the current collector grid 22 and the polytetrafluoroethylene layer 23. The polytetrafluoroethylene layer 23 may be approximately 0.0007 inches thick. The current collector grid 22 is on the electrolyte contacting side 24 of the hydrogen electrode 20 and the polytetrafluoroethylene layer 23 is on the hydrogen contacting side 25 of the hydrogen electrode 20. The active material layer 21 may be dispersed throughout the current collector grid 22. Examples of current collector grids include, but are not limited to, mesh, grid, matte, expanded metal, foil, foam and plate. The current collector grid may be composed of a conductive material such as nickel, a nickel alloy, copper, nickel plated copper or a copper-nickel alloy. Other conductive materials may be substituted as required by design constraints. The hydrogen electrode may also include an electrically conductive powder intimately mixed with the hydrogen storage material which aids in current collection. The electrically conductive powder may be formed from copper, a copper alloy, nickel, a nickel alloy, and carbon to aid.

The active material layer 21 may be composed of Misch metal nickel alloy, Raney nickel, graphite, and polytetrafluoroethylene powder. A preferred composition of the active material layer 21 is by weight 35% Mischmetal nickel alloy, 46% Raney nickel, 4% graphite, and 15% polytetrafluoroethylene. The most preferred Misch metal nickel alloy has the following composition by weight percent: 50.07% Ni, 10.62% Co, 4.6% Mn, 1.8% Al, 20.92% La, 8.63% Ce, 0.87% Pr, and 2.49% Nd. The graphite may be one with isotropic shape having high electrical and thermal conductivity. A typical example of such graphite is called TIMREX KS-75 (Trademark of Timcal Group). Raney nickel and polytetrafluoroethylene are well known in the art and do not need any further discussion.

It should be noted that the hydrogen electrode and oxygen electrode active materials of the instant invention are robust and very resistant to poisoning. This is true because the increased number of catalytically active sites of these materials not only increases catalytic activity, but enables the materials to be more resistant to poisoning, because with materials of the present invention numerous catalytically active sites can be sacrificed to the effects of poisonous species while a large number of non-poisoned sites still remain active to provide the desired catalysis. Also, some of the poisons are inactivated by being bonded to other sites without effecting the active sites.

FIG. 3 is a stylized schematic depiction of an alkaline fuel cell 30 incorporating the oxygen electrode 10 and the hydrogen electrode 20 of the instant invention. The fuel cell 30 consists of three general sections: 1) a hydrogen electrode section, which includes the hydrogen electrode 20 and a hydrogen supply compartment 31; 2) the electrolyte compartment 32; and 3) the oxygen electrode section, which includes the oxygen electrode 10 and the oxygen (air) supply compartment 32.

In the hydrogen electrode section, hydrogen or hydrogen containing gas mixtures is supplied under pressure to the hydrogen supply compartment 31 through hydrogen inlet 33. Hydrogen is then absorbed through the hydrogen contacting surface 25 into the hydrogen electrode 20. The absorbed hydrogen is catalytically broken down by the anode active material into atomic hydrogen which is stored in the hydrogen storage material as a hydride, and then finally reacts at the electrolyte contacting surface 24 with hydroxyl ions to form water. It should be noted that the heat of hydride formation helps to warm the fuel cell to it's optimal operating temperature. Any unabsorbed hydrogen and other contaminant gases or water vapor in the hydrogen supply are vented through outlet 34. The gases that are vented may be recycled if enough hydrogen is present to warrant recovery. Otherwise the hydrogen may be used to provide a source of thermal energy if needed for other components such as a hydride bed hydrogen storage tank.

The electrolyte compartment 32 holds (in this specific example) an aqueous alkaline electrolyte in intimate contact with the hydrogen electrode 20 and the oxygen electrode 10. The alkaline solution is well known in the art and is typically a potassium hydroxide solution. The electrolyte provides hydroxyl ions which react with hydrogen ions at electrolyte contacting surface 24 of the hydrogen electrode 20 and water molecules which react with oxygen ions at the electrolyte contacting surface 15 of the oxygen electrode 10. The electrolyte is circulated through compartment 32 via inlet 35 and outlet 36 (in alternative embodiments, the electrolyte may be deliberately immobilized as by jelling, etc.) The circulated electrolyte may be externally heated or cooled as necessary, and the concentration of the electrolyte can be adjusted (as via wicking, etc.) as needed to compensate for the water produced by the cell and any losses due to evaporation of water through the electrodes. Systems for conditioning the fuel cell electrolyte are well known in the art and need not be further described in detail herein.

In the oxygen electrode section, oxygen, air, or some other oxygen containing gaseous mixture is supplied to the oxygen supply compartment 32 through oxygen inlet 37. Oxygen is then absorbed through the oxygen contacting surface 16 into the oxygen electrode 10. The absorbed oxygen is catalytically broken down by the cathode active material into ionic oxygen, which finally reacts at the electrolyte contacting surface 15 (via the redox couple) with water molecules to form hydroxyl ions. Any unabsorbed oxygen and other gases in the feed (e.g. nitrogen, carbon dioxide, etc.) or water vapor in the oxygen supply are vented through outlet 38.

Such fuel cells may, as a system, further comprise an electrolyte conditioning means for conditioning the electrolyte. This electrolyte conditioning system will not only adjust the temperature of the electrolyte (for optimal fuel cell performance) but will also remove water from the electrolyte. The water removal is necessary because water is produced as a by-product of the fuel cell's electrochemical hydrogen oxidation reaction. This water, if not removed would dilute the electrolyte, thus impeding the optimal performance of the fuel cell.

These fuel cells will further include, as a system, a hydrogen supply source including means for continuously supplying fuel, particularly molecular hydrogen, to the hydrogen electrode's first surface region; an oxygen supply source which includes means for continuously supplying molecular oxygen to the oxygen electrode's first surface region; and an electrolyte conditioning system which includes means for continuously conditioning the electrolyte, thereby enabling continuous operation of the fuel cell as an electrical power source.

Fuel cells of the instant invention using oxygen electrode with redox couples, particularly in combination with the hydrogen storage anodes of the '116 application provide the ability to recapture reverse electrical power flow from an external circuit into said fuel cell, electrolytically producing hydrogen and oxygen which are absorbed and stored through the mechanism of the redox couple in the oxygen electrode and the hydrogen storage material in the hydrogen electrode. When the instant fuel cell is run in reverse, as an electrolyzer, during an energy recapture process such as regenerative braking, water is electrolyzed into hydrogen and oxygen. In this regenerative braking mode, the electric motors reverse their roles and become generators using up the kinetic energy of the motion. This causes a spike of current which amounts to about 10% of the normal operating load. A conventional fuel cell (alkaline or P.E.M.) cannot accept such surges. This feedback of energy would cause rapid hydrogen and oxygen evolution which would cause the catalysts to lose their integrity and adhesion thereby undermining the overall system performance. In the inventive fuel cell, this will not be a problem, because the hydrogen storage anode and the oxide couple oxygen electrode will take the surge current and become charged with the produced hydrogen or oxygen respectively.

FIG. 4 is a stylized schematic depiction of an energy supply system 40 incorporating the alkaline fuel cell 30 of the instant invention. The energy supply system also includes a source of hydrogen 41. The source may be of any known type, such as a hydride bed storage system, a compressed hydrogen storage tank, a liquid hydrogen storage tank, or a hydrocarbon fuel reformer. The preferred source is a metal hydride storage system. The hydrogen from the source 41 is transported to the fuel cell 30 via input line 50, and excess gases are vented through output line 51. A portion of the gases from output line 51 may be recycled to input line 50 through recycle line 52. The energy supply system also includes a source of oxygen, which is preferably air for economic reasons. The air is drawn into line 53 and then can be passed through a carbon dioxide scrubber 42. The air is then transported to the fuel cell 30 via input line 54. Excess air and unused gases are vented through output line 55. Since this gas stream contains no harmful gases, it may be vented to the environment directly.

The energy supply system may also include an electrolyte recirculation system. The electrolyte from the fuel cell 30 is removed through output line 56 and sent to an electrolyte conditioner 43. The electrolyte conditioner 43 heats or cools the electrolyte as needed and removes/adds water as necessary. The conditioned electrolyte is then returned to the fuel cell 30 via input line 57.

Finally the energy supply system includes electrical leads 44 and 45 which supply electricity from the fuel cell 30 to a load 46. The load can be any device requiring power, but particularly contemplated is the power and drive systems of an automobile.

The instant fuel cell and energy supply systems incorporating it are particularly useful for applications in which instant start and energy recapture are requirements thereof, such as for example in powering a vehicle. For instance, in consumer vehicle use, a fuel cell that has the built in fuel and oxidizer storage of the instant invention has the advantage of being able to start producing energy instantly from the reactants stored in its electrodes. Thus, there is no lag time while waiting for hydrogen to be supplied from external sources. Additionally, because hydrogen and oxygen can be adsorbed and stored in the respective electrode materials of the fuel cell, energy recapture can be achieved as well. Therefore, activities such as regenerative braking, etc., can be performed without the need for an battery external to the fuel cell because any reactants produced by running the fuel cell in reverse will be stored in the electrodes of the fuel cell. Therefore, in essence, fuel cells employing the instant active electrode materials are the equivalent of a fuel cell combined with a battery. In such a system employing the redox couples oxygen is also able to be stored within the electrode to a significant degree as an oxidized component of the couple, preferably a metal/metal oxide couple, a hydroxide/oxyhydroxide, or combinations thereof.

The novel electrochemical cell of the present invention also enables the practice of the method of the invention which, in one embodiment thereof, comprises the indirect and continuous introduction of both the fuel, preferably hydrogen, and the reactant which oxidizes the fuel, preferably oxygen, for the continuous operation of the electrochemical cell as a fuel cell. That is, the hydrogen is, during operation, continuously introduced through a catalytic region in the negative electrode and continuously stored as a hydride in a region of material in the negative electrode which is capable of reversibly storing and releasing hydrogen. Simultaneously therewith hydrogen is electrochemically released from the negative electrode, on its electrolyte side, to participate in the cell reaction process so that continuous supply at the gas side, storage within, and release of hydrogen at the electrolyte side of, the negative electrode is made possible.

At the same time oxygen is continuously introduced at the gas side of the positive electrode through a catalytic region and chemically stored as a material in the form of the charged state of an oxide couple which participates in the cell reaction. Simultaneously with the introduction and chemical storage of the oxygen as just explained the material of the oxide couple which is in the charged state participates in the cell reaction to generate electrical power. Thus an electrochemical cell is continuously operated through the supply to the gas side, storage within, and release from the electrolyte side of, the oxidant so that operation as a fuel cell is enabled. The unique method of the invention of operation of an electrochemical cell as a fuel cell is thus made possible. In the situations in which the fuel cell is run "backwards" or as an electrolyzer to recapture and store energy, such as for example, during regenerative braking, the operating nature as described earlier would not be considered to be disruptive to "continuous" operation.

The drawings, discussion, descriptions, and examples of this specification are merely illustrative of particular embodiments of the invention and are not meant as limitations upon its practice.

The invention claimed is:

1. In a fuel cell, an oxygen electrode including a cathode active material having oxygen storage capacity comprising:
    a manganese oxide redox couple which provides for said oxygen storage capacity via reduction/oxidation between two different manganese oxide valency states.

2. The fuel cell oxygen electrode of claim 1, further including a hydrophobic component.

3. The fuel cell oxygen electrode of claim 2, wherein said hydrophobic component comprises polytetrafluoroethylene (PTFE).

4. The fuel cell oxygen electrode of claim 3, wherein said PTFE is at least one of:
    a) intimately mixed with said cathode active material;
    b) graded within said cathode active material; or
    c) a separate layer incorporated within said oxygen electrode.

5. The fuel cell oxygen electrode of claim 1, further including a current collector extending within said active material.

6. The fuel cell oxygen electrode of claim 5, wherein said current collector comprises an electrically conductive mesh, grid, foam, expanded metal, or combinations thereof.

7. The fuel cell oxygen electrode of claim 1, further including a catalytic carbon component.

8. In a fuel cell, said fuel cell including a cathode active material having oxygen storage capacity comprising:
    a manganese oxide redox couple which provides for said oxygen storage capacity via reduction/oxidation between two different manganese oxide valency states.

9. The fuel cell of claim 8, wherein said oxygen storage capacity provides said fuel cell with instant startup capability.

10. The fuel cell of claim 8, wherein said oxygen storage capacity provides said fuel cell with the ability to accept recaptured energy by running in reverse as an electrolyzer.

11. The fuel cell of claim 8, wherein said oxygen electrode further includes a hydrophobic component which comprises polytetrafluoroethylene.

12. The fuel cell of claim 8, wherein said oxygen electrode further includes a current collector extending within said active material.

13. The fuel cell of claim 12, wherein said current collector comprises an electrically conductive mesh, grid, foam or expanded metal.

14. The fuel cell of claim 8, wherein said oxygen electrode further includes a catalytic carbon component.

15. The fuel cell of claim 8, wherein said fuel cell further includes a hydrogen electrode, said hydrogen electrode including an anode active material having hydrogen storage capacity.

16. The fuel cell of claim 15, wherein said hydrogen storage capacity additionally provides said fuel cell with instant startup capability.

17. The fuel cell of claim 16, wherein said hydrogen storage capacity additionally provides said fuel cell with the ability to accept recaptured energy by running in reverse as an electrolyzer.

18. The fuel cell of claim 15, wherein said hydrogen storage capacity provides thermal energy to said fuel cell via the heat of formation of the hydride thereof.

19. The fuel cell of claim 15, wherein said anode active material is a hydrogen storage alloy which does not include noble metal catalysts.

20. The fuel cell of claim 19, wherein said hydrogen storage alloy is selected from the group consisting of Alkaline Earth-Nickel alloys, Rare Earth/Misch metal alloys, zirconium alloys, titanium alloys, and mixtures or alloys thereof.

* * * * *